United States Patent

Kubono

[11] 4,160,389
[45] Jul. 10, 1979

[54] CENTRIFUGAL CLUTCH AND DRIVE MECHANISM FOR REMOTE CONTROL APPARATUS

[75] Inventor: Takashi Kubono, Omiya, Japan

[73] Assignees: Toyo Kogyo Company Limited, Hiroshima; Tanaka Instrument Company Limited, Yono, both of Japan

[21] Appl. No.: 758,367

[22] Filed: Jan. 11, 1977

[30] Foreign Application Priority Data

Jan. 13, 1976 [JP] Japan ............................. 51-1789[U]

[51] Int. Cl.² ........................ F16H 21/40; F16D 43/18
[52] U.S. Cl. ..................................... 74/89.18; 74/98; 74/99 R; 74/109; 192/103 B
[58] Field of Search ................. 74/25, 89.11, 112, 98, 74/99, 89.18, 109; 192/103 B, 105 BA

[56] References Cited

U.S. PATENT DOCUMENTS 2,063,426  12/1936  Galvin et al. ............. 192/105 BA X Primary Examiner—C. J. Husar
Assistant Examiner—Conrad L. Berman
Attorney, Agent, or Firm—Sughrue, Rothwell, Mion, Zinn and Macpeak

[57] ABSTRACT

A pair of slotted, sector-shaped centrifugal weights 7, 8 are radially slidable on posts 5, 6 upstanding from a disk 4 mounted on the drive shaft 2 of a reversible electric motor 1. A cup member 11 carrying a pinion gear 13 is rotatably journalled on the shaft, and includes a cylindrical wall 11a surrounding the weights. A reduction gear mechanism 12 transmits the rotation of the pinion gear to a pivotally mounted sector gear 16, to which a linearly movable actuating rod 17 is connected. Alternatively, a plurality of sector-shaped weights 27 may be accomodated in similar shaped cavities between a pair of radially partitioned discs 24a, 24b.

8 Claims, 3 Drawing Figures

CENTRIFUGAL CLUTCH AND DRIVE MECHANISM FOR REMOTE CONTROL APPARATUS

BACKGROUND OF THE INVENTION

This invention relates to a centrifugal clutch and drive mechanism for the remote control of a movable device, such as a vehicle door opener, trunk lid opener, etc.

Known remote control apparatusses include both solenoid means and a large, high torque motor coupled to a low ratio reduction gear mechanism, with both of which the remotely controlled mechanism may be operated either electrically or manually. Both the solenoid means and the motor and gear mechanism are unduly large and costly, however, consume an inordinate amount of electric current, and are difficult to install in a limited space.

To meet such limited space requirements it is logical to resort to a compact, high speed motor coupled to a high ratio reduction gear mechanism.

Such a combination creates problems, however, when there is a limiting restriction to the movement of the remote controlled mechanism and the motor remains energized. In such situations overloading may occur, and cause electrical and/or mechanical failure or damage to the system components. Furthermore, if alternate manual operation of the remote controlled mechanism must be provided for, as for safety considerations with vehicle door locks, the operator must exert considerable effort since he must "spin up" both the reduction gears and the high speed motor.

SUMMARY OF THE INVENTION

The above drawbacks and disadvantages of the prior art systems are effectively overcome by the present invention, according to which the power generated by a drive motor is transmitted through a centrifugal clutch and reduction gear mechanism to a remote controlled mechanism when the motor is energized. The centrifugal clutch is automatically disengaged and the drive train is thereby interrupted when the motor is deenergized whereby an operator may easily manually operate the remote controlled mechanism with little effort.

The centrifugal clutch is disposed between the motor and the remote controlled mechanism, and a sector gear is disposed between the centrifugal clutch and the remote controlled mechanism, the sector gear swinging over a predetermined angular range to operate the remote controlled mechanism.

DETAILED DESCRIPTION OF THE PREFERRED EMBODIMENTS

Figure 1:
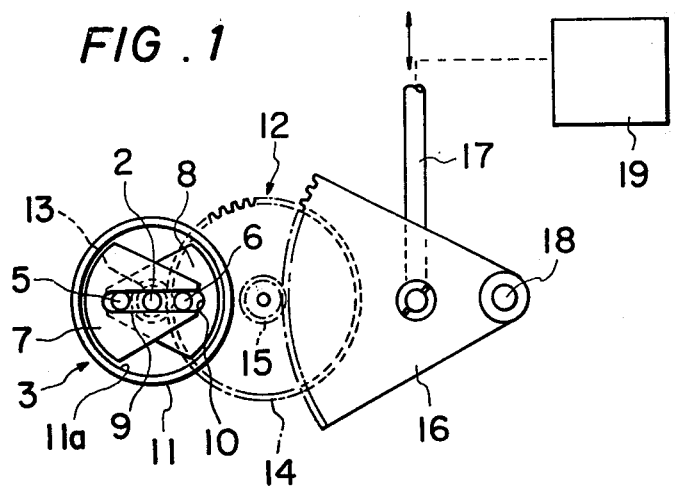
FIG. 1 shows a bottom view of a first embodiment of the invention.
Figure 2:
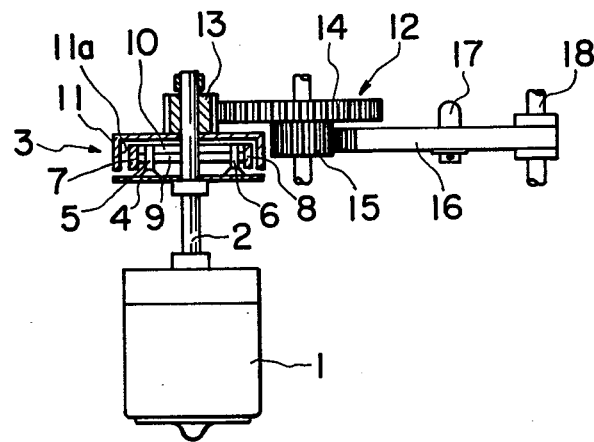
FIG. 2 shows a partially sectional elevation view of FIG. 1.

Referring now to the drawings, FIGS. 1 and 2 show an embodiment of the invention used for the remote control of an automobile door lock. A centrifugal clutch 3 is mounted on the output or drive shaft 2 of a reversible electric motor 1. The clutch comprises a disk 4 secured to the motor shaft and a pair of pins 5, 6 upstanding from the disk. The pins are positioned on diametrically opposite sides of the shaft 2, and are slidably engaged or inserted in slots 9, 10 formed in centrifugal weight members 7, 8, respectively. As a result, the weight members are constrained to rotate with the disk 4, but are able to move freely in a radial direction. A cylindrical cup 11 has an inner wall 11a loosely surrounding the weight members such that they are thrown radially outwardly into contact with the inner wall by centrifugal force when the motor 1 is energized. A gear 14 of a reduction gear mechanism 12 engages a pinion 13 axially secured to the cylindrical cup 11, and a smaller gear 15 coaxially mounted on the gear 14 engages a sector gear 16 mounted on a pivot shaft 18. An actuating rod 17 coupled to a manual control lever (not shown) for the door lock is pivotally connected to the sector gear 16. Thus, the high speed rotational movement of the motor 1 is translated into a centrifugally coupled, relatively slow speed linear movement of the actuating rod 17. The connection between the actuating rod and the sector gear is not limited to a pivotal connection, and a swingable connection may also be employed. Pivotal and swingable connections are preferable for most applications, but a rigid connection may also be used to obtain the desired linear movement. The actuating rod 17 is also coupled to the remote controlled mechanism 19, such as a vehicle door lock.

When the motor 1 is energized by a switch (not shown) near the driver's seat, for example, the disk 4 together with the pins 5, 6 begins to rotate. The weight members 7, 8 also rotate, and move radially outwardly to press against the inner wall 11a of the cup 11 by centrifugal action. As a result, the rotation of the motor 1 is transmitted to the sector gear 16 through the cup 11, the pinion 13, the gear 14 and the gear 15, whereby the sector gear 16 is driven in its range of angular movement. This in turn drives the actuating rod 17 in a substantially linear or straight manner, thereby locking or unlocking the door mechanism 19.

Even if the motor remains energized after the sector gear 16 and the actuating rod 17 have reached the limit of their movement, no damage occurs since the centrifugal clutch simply slips when an excess load is applied. The slippage threshold can be easily set by appropriately selecting the weights of the members 7, 8 and the frictional characteristics thereof.

Conversely, when the motor 1 is deenergized the weight members 7, 8 are not subjected to centrifugal action and easily separate from the inner wall 11a of the cup 11. Thus, when the door lock lever is manually operated the movement of the actuating rod 17 is not transmitted to the motor 1 since the cylindrical cup 11 simply spins in an idling or no-load manner on the shaft 2, whereby manual locking or unlocking is easily accomplished.

Figure 3:
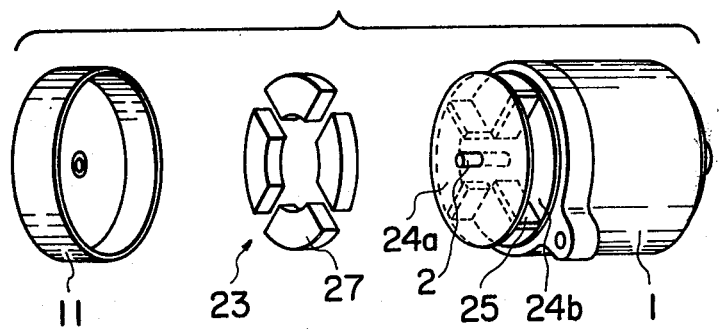
FIG. 3 shows an exploded view of an alternate centrifugal clutch mechanism according to the invention.

FIG. 3 shows an alternate centrifugal clutch mechanism 23 including a rotatable disk having an upper plate 24a and a lower plate 24b, and radial partition plates 25 fixedly inserted therebetween. Each sector-shaped weight member 27 is accomodated in a space defined by the upper plate 24a, the lower plate 24b and the partition plates 25. The functioning of the centrifugal clutch mechanism 23 is identical to that of the mechanism 3 in FIG. 1.

What is claimed is:

1. An apparatus for driving a remote controlled mechanism, comprising;
   (a) an electric motor having a rotatable drive shaft,
   (b) centrifugal clutch means comprising a plurality of weight members, a weight mounting means secured to said drive shaft for rotation therewith and including means loosely mounting and confining said weight members such that they are freely movable in a radial direction but are constrained to rotate with said weight mounting means, and a cylindrical member freely rotatably mounted to said drive shaft and including an inner wall surrounding said weight members, whereby the latter are moved radially outwardly by centrifugal force when said motor is energized, and frictionally engage and drive said cylindrical member,
   (c) a pinion gear secured to said cylindrical member,
   (d) reduction gear means engaging said pinion gear,
   (e) a pivotally mounted sector gear engaging said reduction gear means and adapted to swing over a predetermined angular range in response to the rotation of said reduction gear means, and
   (f) an actuating member connected to said sector gear and adapted to move in a substantially linear manner for operating said remote controlled mechanism in response to the energization of said motor.

2. An apparatus as claimed in claim 1, wherein said weight members are sector-shaped.

3. An apparatus as claimed in claim 1, wherein said actuating member is swingably connected to said sector gear.

4. An apparatus as claimed in claim 1, wherein said actuating member is pivotably connected to said sector gear.

5. An apparatus as claimed in claim 1, wherein said weight mounting means comprises a disk member secured to said drive shaft, and a plurality of projections fixed to said disk member for restricting the free movement of the weight members to a radial direction.

6. An apparatus as claimed in claim 5, wherein said disk member includes an upper plate and a parallel lower plate, and each projection is a radial partition plate mounted between said upper and lower plates to define a plurality of sector-shaped cavities, each of said weight members being loosely accomodated in one of said cavities.

7. An apparatus as claimed in claim 5, wherein said projections are pins.

8. An apparatus as claimed in claim 7 wherein each of said weight members has a slot in which at least one pin is slidingly inserted.

* * * * *